H. J. GRISWOLD.
TIRE.
APPLICATION FILED NOV. 23, 1912.
1,088,820.
Patented Mar. 3, 1914.
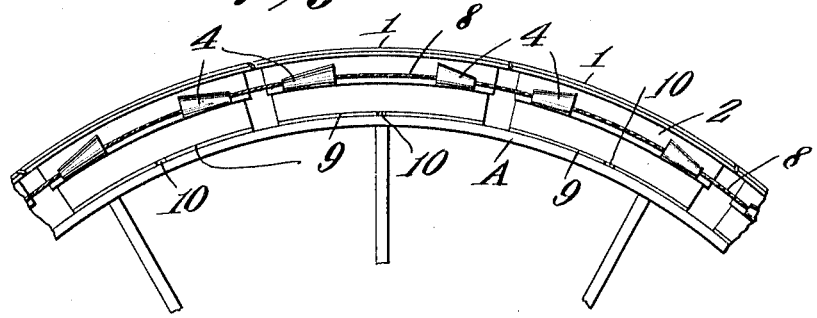
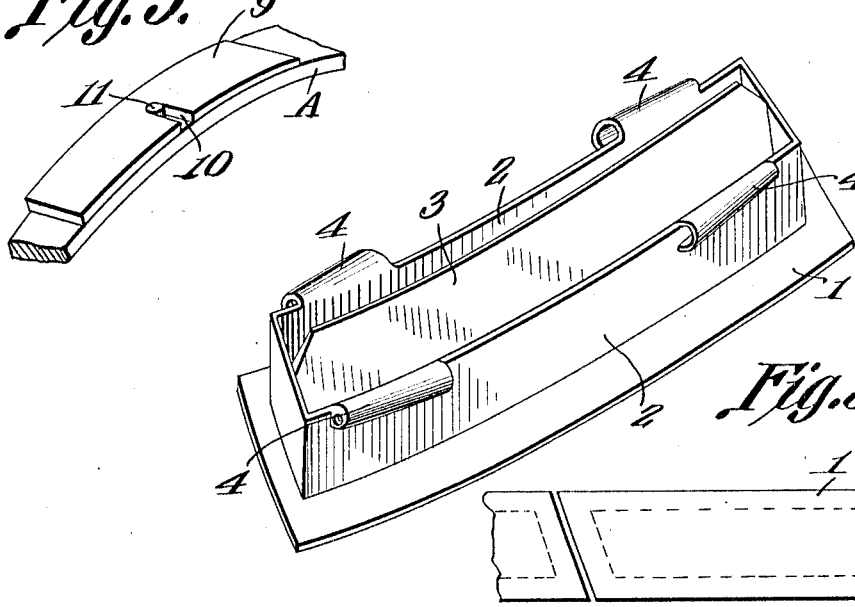
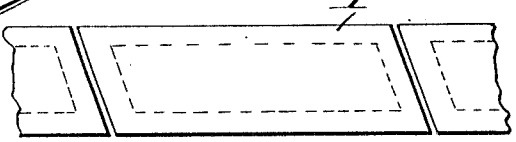
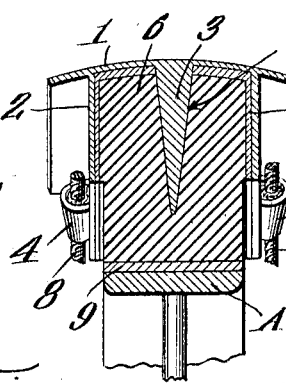
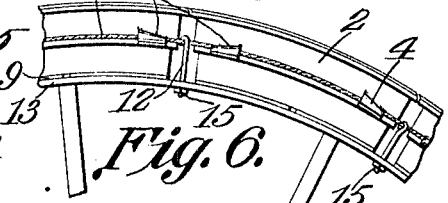
Harry J. Griswold,
Inventor
by C. A. Snow & Co.
Attorneys
Witnesses

UNITED STATES PATENT OFFICE.

HARRY J. GRISWOLD, OF BAYSIDE, CALIFORNIA.

TIRE.

1,088,820. Specification of Letters Patent. Patented Mar. 3, 1914.

Application filed November 23, 1912. Serial No. 733,223.

*To all whom it may concern:*

Be it known that I, HARRY J. GRISWOLD, a citizen of the United States, residing at Bayside, in the county of Humboldt and State of California, have invented a new and useful Tire, of which the following is a specification.

This invention relates to tires for vehicle wheels, its object being to provide a composite tire made up of rubber and metal, the wearing surface being formed of metal and being spaced from the rim of the wheel by cushioning blocks of rubber connected to the metal in a novel manner.

Another object is to provide a tire of this character made up of sections which are held together by tie devices connected thereto at points where they will not interfere with the action of the tire and where they are readily accessible.

With the foregoing and other objects in view which will appear as the description proceeds, the invention resides in the combination and arrangement of parts and in the details of construction hereinafter described and claimed, it being understood that changes in the precise embodiment of the invention herein disclosed, can be made within the scope of what is claimed, without departing from the spirit of the invention.

In the accompanying drawings the preferred form of the invention has been shown.

In said drawings:—Figure 1 is a side elevation of a portion of a wheel having the tire applied thereto. Fig. 2 is an enlarged transverse section through the tire. Fig. 3 is a perspective view of one of the metallic sections of the tire inverted. Fig. 4 is a plan view of a portion of the tire. Fig. 5 is a perspective view of a portion of the wheel and showing a shim in position thereon. Fig. 6 is a side elevation of a portion of a wheel showing a modified means for tightening the tire.

Referring to the figures by characters of reference 1 designates a rhomboidal wear plate slightly bowed transversely and longitudinally. Extending from the inner or concave face of this wear plate are the walls of a cup 2 of the same outline as the plate 1, the said walls being parallel with the corresponding edges of the plate. A wedge-shaped partition 3 extends longitudinally within the cup along the center thereof and projects beyond the free edges of the walls, this partition dividing the interior of the cup into opposed similar compartments. Portions of the side or longitudinal walls of the cup are rolled outwardly to form sleeves 4 tapered toward one end.

A lining of asbestos or other suitable insulating material, such as shown at 5, is provided upon the inner surface of each wall of the cup and upon the bottom of the cup. A cushioning block 6 of soft rubber is arranged in the cup and completely fills it, said block being formed with a longitudinal slit 7 into which the partition 3 projects, as shown in Fig. 2. The cushioning block 6 projects beyond the outer or free edge of the partition and is adapted to bear upon the rim A of the wheel.

It is to be understood that the tire constituting the present invention is made up of a plurality of sections such as hereinbefore described. These sections are held assembled by means of tie devices 8 preferably formed of wire cables. These tie devices are endless and are threaded through the sleeves 4. They are are such length as to hold the blocks 6 slightly under compression and in contact with the rim A. After the tie devices have been inserted into the sleeves 4 and fastened together at their ends, the sleeves are filled with Babbitt metal or the like so as to fasten them against longitudinal displacement along the tie devices. In other words, the sections of the tire are thus held properly spaced apart.

It will be noted that, when the sections of the tire are assembled, the wear plates 1 contact at their ends and thus hold the cups 2 spaced apart. Furthermore the side edges of the wear plates 1 extend laterally beyond the cups so as to overhang the tie devices 8 and the sleeves 4 and prevent them from coming into contact with the road or with any obstruction upon the road. Obviously the cushioning blocks 6 will be sufficiently resilient to cause the wheel A to travel easily over a road, the construction of the tire being such as to provide the same amount of flexibility and cushioning action as is obtained by the use of a solid all rubber tire. Moreover, by providing the metallic wear surfaces, the tire is rendered much more lasting. The tire can be easily sprung onto a wheel because of the resiliency of the rim-engaging cushioning blocks 6 and, if it should be found necessary to tighten the tire upon the rim, thin metal plates or shims 9 may be inserted between the blocks 6 and the rim A, each shim having a transversely extending slot 10 designed to receive a stud 11 extending radially from the rim A. Thus the shim is held against displacement relative to the rim.

It will be noted that the ends of the wear plates 1 are diagonally disposed so that each wear plate is thus in the form of a rhomboid. This construction is advantageous because it permits each cup to come into contact with the ground before the cup in advance thereof is entirely withdrawn from the ground. The cups will not, therefore, produce the pounding or thumping effect which would result should they be brought intermittently into contact with the ground. Furthermore, the ends of the cups are spaced apart short distances so as not to jam or wear upon each other.

It is to be understood that instead of employing shims for tightening the tire upon the rim, other tightening means may be employed such, for example, as hook bolts 12 extending radially through the rim 13 of the wheel and engaging the cabinets 8 at points between the cups 2 so that, by drawing the bolts inwardly toward the center of the wheel by means of nuts 15, the cables will be pulled taut and the tire caused to bind tightly on the wheel.

What is claimed is:—

1. A tire including a plurality of similar sections, each comprising a wear plate, a cup upon the inner surface of the plate, a wedge-shaped partition within the cup, a cushioning block straddling the partition and lodged within the cup, said block projecting toward the outer surface of the wheel rim, flexible endless tie devices extending along the sides of the cups, and means upon the cups for engaging said devices to hold the cups against longitudinal movement on the devices, said wear plates overhanging the tie devices.

2. The combination with a wheel rim, of a tire consisting of a plurality of sections each having a wear plate, a cup upon the inner surface of the wear plate, and a cushioning block seated within the cup and extending inwardly toward the rim, tubular portions extending longitudinally upon the sides of the cup and tapered toward the adjacent ends of the cup respectively, endless flexible tie devices extending along the sides of the cup and through said tubular portions, means for tightening the tie devices to bind the tie upon the rim, and tapered securing means fixed upon the tie devices and filling the tubular portions to hold the tie devices against movement in either direction relative to said tubular portions.

In testimony that I claim the foregoing as my own, I have hereto affixed my signature in the presence of two witnesses.

HARRY J. GRISWOLD.

Witnesses:
THOS. B. RILEY,
J. W. BRIDGHAM.

Copies of this patent may be obtained for five cents each, by addressing the "Commissioner of Patents, Washington, D. C."